United States Patent Office 3,235,575
Patented Feb. 15, 1966

3,235,575
3-CHLORO-17α-METHYL-5α-ANDROST-2-ENE COMPOUNDS AND METHODS FOR THEIR PRODUCTION
George W. Moersch and Winifred Ann Neuklis, Ann Arbor, Mich., assignors to Parke, Davis & Company, Detroit, Mich., a corporation of Michigan
No Drawing. Filed May 29, 1963, Ser. No. 283,987
11 Claims. (Cl. 260—397.4)

The present invention relates to novel steriod compounds and to methods for their production. More particularly, it relates to 3-chloro-17α-methyl-5α-androst-2-ene compounds having the formula

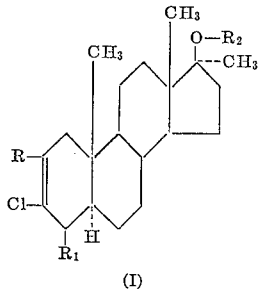

(I)

where R is formyl or di-(lower alkoxy)-methyl; $R_1$ is hydrogen or formyl; and $R_2$ is hydrogen or lower alkanoyl.

In accordance with the invention, 3-chloro-17α-methyl-5α-androst-2-ene compounds having the formula

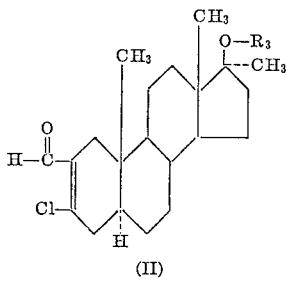

(II)

are prepared by the reaction of 17α-methyl-5α-androstan-3-one compounds of the formula

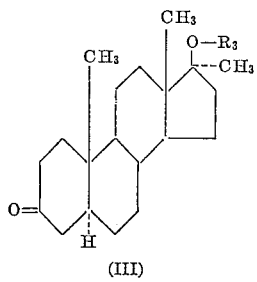

(III)

with a formylating reagent prepared by mixing phosphorus oxychloride with N,N-dimethylformamide. In Formulas II and III, $R_3$ is lower alkanoyl. Excess N,N-dimethylformamide is normally used as the solvent for this reaction. Other inert solvents, such as aromatic hydrocarbons, e.g., benzene, toluene, and xylene, and chlorinated alkanes and alkenes, e.g., tetrachloroethane, pentachloroethane, trichloropropane, and trichloroethylene may also be used, however. When a solvent other than N,N-dimethylformamide is used, equimolar amounts of phosphorus oxychloride and N,N-dimethylformamide may be employed in the preparation of the formylating reagent, although an excess of either component is not harmful; for best results an excess of N,N-dimethyl-formamide is used. In the formation of the phosphorus oxychloride-N,N-dimethylformamide reagent, it is desirable to maintain the temperature at 0–5° C. The reaction for the preparation of the 3-chloro-17α-methyl-5α-androst-2-ene compounds of Formula II is carried out at a temperature in the range of 45–75° C. for a period of 1–4 hours. Temperatures somewhat outside this range may also be used, but longer reaction times should be avoided. Equimolar amounts of the 17α-methyl-5α-androstan-3-one compound and the phosphorus oxychloride-N,N-dimethylformamide reagent may be used; for optimum yields, however, it is preferable to employ two molar equivalents of the phosphorus oxychloride-N,N-dimethylformamide reagent for each mole of the 17α-methyl-5α-androstan-3-one compound.

The 17α-methyl-5α-androstan-3-one compounds of Formula III used as starting materials in the foregoing process are prepared by the reaction of 17α-methyl-5α-androstan-17β-ol-3-one with a lower alkanoic acid or a reactive derivative thereof, such as the halide or anhydride.

In accordance with a second process, 3-chloro-17α-methyl-5α-androst-2-ene compounds of the invention having the formula

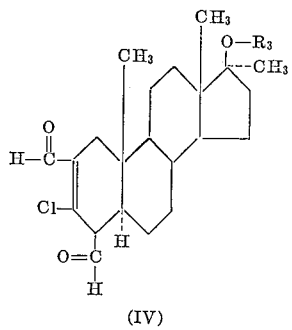

(IV)

are prepared by the reaction of 17α-methyl-5α-androstan-3-one compounds of Formula III with the phosphorus oxychloride - N,N-dimethylformamide reagent described above for a period of more than 6 hours duration. In Formula IV, $R_3$ has the aforementioned significance. The solvents used in this process are the same as those mentioned above for use in the foregoing process. Normally, excess N,N-dimethylformamide is used as the solvent. Although equimolar amounts of the 17α-methyl-5α - androstan - 3 - one compound and the phosphorus oxychloride - N,N - dimethylformamide reagent may be used, for optimum yields a large excess (up to eight-fold) of the latter reagent is employed. The reaction is normally carried out at a temperature in the range of 45–75° C.; somewhat higher temperatures may also conveniently be used, however. The duration of the reaction beyond 6 hours is not critical, and the reaction may be run for as long as 24 hours.

Also in accordance with the invention, 3-chloro-17α-methyl-5α-androst-2-ene compounds having the formula

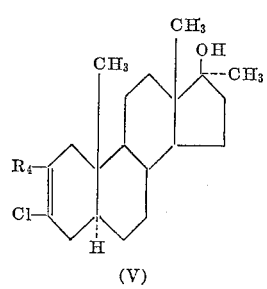

(V)

are prepared by the reaction of 3-chloro-17α-methyl-5α-androst-2-ene compounds of the formula

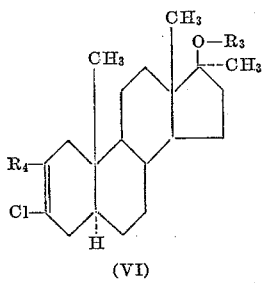

(VI)

with a base; where $R_3$ has the aforementioned significance and $R_4$ is di-(lower alkoxy)-methyl. Suitable bases for use in this reaction are the alkali metal hydroxides, such as potassium hydroxide. Alcoholic solvents, such as ethanol, n-propanol, and isopropanol, and aqueous mixtures of these are normally employed. The reaction is best carried out at the reflux temperature of the solvent for a period of from 1 to 6 hours. It is preferable to employ an excess of the base.

The 3-chloro-17α-methyl-5α-androst-2-ene compounds of Formula VI used as starting materials in the foregoing process are prepared by the reaction of compounds of Formula II with a large excess of a lower alcohol, such as methanol or ethanol, in the presence of a small amount of hydrochloric acid.

In accordance with yet another process, the 2-formyl-3 - chloro - 17α - methyl-17β-hydroxy-5α-androst-2-ene compound of the invention having the formula

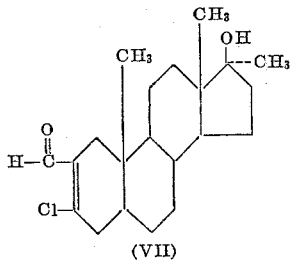

(VII)

is prepared by the acid-catalyzed hydrolysis of 3-chloro-17α-methyl-5α-androst-2-ene compounds having the Formula V. In this reaction a catalytic amount of a mineral acid, such as sulfuric acid, is employed. Suitable solvents for use in this reaction are aqueous mixtures of water-miscible inert organic solvents, such as tetrahydrofuran, dioxane, and 1,2-dimethoxyethane. The reaction is normally carried out at a temperature in the range of 15–35° C. for a period of several hours duration. For maximum yields, the excess acid is neutralized with a suitable base, such as sodium bicarbonate, prior to isolation of the product.

The compounds of the invention are useful pharmacological agents. They exhibit myotropic activity accompanied by a low degree of androgenicity. They are active upon oral administration.

The invention is illustrated by the following examples:

*Example 1*

A solution of 7.8 ml. of phosphorus oxychloride in 9 ml. of N,N-dimethylformamide is prepared at 0–5° C. To this stirred solution is added a solution of 17 g. of 17α-methyl-17β-acetoxy-5α-androstan-3-one in 170 ml. of N,N-dimethylformamide over a 15-minute period at room temperature. Stirring at room temperature is continued until all the solid is dissolved, and the solution is heated at 50–55° C. for 3.5 hours. After cooling, the solution is poured into ice water, and the precipitate obtained is isolated, washed with water, dried, and dissolved in benzene. The benzene solution is washed in turn with three 150-ml. portions of 3 N hydrochloric acid, three 200-ml. portions of 5% aqueous sodium bicarbonate and 200 ml. of water. The benzene solution is then dried over anhydrous magnesium sulfate. The dried solution is evaporated to dryness under reduced pressure at 50–60° C., and the 2-formyl-3-chloro-17α-methyl-17β-acetoxy-5α-androst-2-ene obtained is crystallized three times from aqueous ethanol; M.P. 140–142° C.

In the foregoing procedure, 17 g. of 17α-methyl-17β-propionoxy-5α-androstan-3-one can be substituted for the 17α-methyl-17β-acetoxy-5α-androstan-3-one to prepare 2-formyl - 3-chloro-17α-methyl-17β-propionoxy-5α-androst-2-ene.

The 17α - methyl-17β-propionoxy-5α-androstan-3-one used above can be prepared as follows: A solution of 2.0 g. of 17α-methyl-5α-androstan-17β-ol-3-one in 50 ml. of propionic anhydride is heated under reflux for 3 hours. The solution is evaporated to near-dryness under reduced pressure, and the residue is triturated twice with warm methanol, evaporated to dryness, and crystallized from methanol.

*Example 2*

A solution of 10 g. of 17α-methyl-17β-acetoxy-5α-androstan-3-one in 100 ml. of N,N-dimethylformamide is added with stirring to a reagent prepared from 20.4 ml. (34 g.) of phosphorus oxychloride and 24 ml. of N,N-dimethylformamide, and the mixture is heated at 50–55° C. for 18 hours. The mixture is allowed to cool, and is poured over ice. An excess of aqueous sodium acetate is added, and the mixture is heated on the steam bath for 20 minutes. The solid obtained is isolated by filtration, washed with water, dried, and dissolved in benzene. The benzene solution is washed in turn with several 100-ml. portions of 3 N hydrochloric acid (until the washings are colorless), with three 150-ml. portions of 5% aqueous sodium bicarbonate, and with several 100-ml. portions of water. The benzene solution is dried over anhydrous magnesium sulfate, the dried solution is evaporated to dryness under reduced pressure, and the solid 2,4-diformyl - 3-chloro-17α-methyl-17β-acetoxy-5α-androst-2-ene obtained is triturated with n-hexane, isolated by filtration, and crystallized, first from n-hexane and then from a 50% ether-50% n-hexane mixture; M.P. 192–193° C.

In the foregoing procedure, 10 g. of 17α-methyl-17β-propionoxy-5α-androstan-3-one can be substituted for the 17α - methyl - 17β-acetoxy-5α-androstan-3-one to prepare 2,4 - diformyl - 3-chloro-17α-methyl-17β-propionoxy-5α-androst-2-ene.

*Example 3*

A solution of 10 g. of 2-formyl-3-chloro-17α-methyl-17β-acetoxy-5α-androst-2-ene, dimethyl acetal in 250 ml. of 5% ethanolic potassium hydroxide is heated under reflux for 3 hours. After cooling, the solution is diluted with water to a volume of 1000 ml. and the 2-formyl-3-chloro-17α-methyl-17β-hydroxy-5α-androst-2-ene, dimethyl acetal obtained is isolated by filtration, washed with water and dried; M.P. 139–140° C., after crystallization from aqueous methanol.

In the foregoing procedure, 10 g. of 2-formyl-3-chloro-17α-methyl-17β-acetoxy-5α-androst-2-ene, diethyl acetal may be substituted for the 2-formyl-3-chloro-17α-methyl-17β-acetoxy-5α-androst-2-ene, dimethyl acetal to prepare 2 - formyl-3-chloro-17α-methyl-17β-hydroxy-5α-androst-2-ene, diethyl acetal.

The 2 - formyl-3-chloro-17α-methyl-17β-acetoxy-5α-androst-2-ene, dimethyl acetal used as starting material in the above procedure is prepared as follows: A solution of 2.15 g. of 2-formyl-3-chloro-17α-methyl-17β-acetoxy-5α-androst-2-ene in 450 ml. of absolute methanol is treated with 5 drops of concentrated hydrochloric acid and the resulting solution is kept at room temperature for 30 minutes. The acidic solution is then neutralized with sodium bicarbonate and concentrated to near-dryness under reduced pressure. The residual solution is diluted with water and cooled in ice. The 2-formyl-3-chloro-17α-methyl-17β-acetoxy-5α-androst-2-ene, dimethyl acetal obtained is isolated, washed with water, and dried under reduced pressure; M.P. 116–118° C.

In a similar manner, 2-formyl-3-chloro-17α-methyl-17β-acetoxy-5α-androst-2-ene, diethyl acetal is prepared from 2.2 g. of 2-formyl-3-chloro-17α-methyl-17β-acetoxy-5α-androst-2-ene and 450 ml. of absolute ethanol.

*Example 4*

A solution of 3.39 g. of 2-formyl-3-chloro-17α-methyl-17β-hydroxy-5α-androst-2-ene, dimethyl acetal in a mixture of 250 ml. of tetrahydrofuran and 25 ml. of water is treated with 15 drops of 12 N sulfuric acid and kept at room temperature for 2 hours. The acidic solution is then neutralized with 5% aqueous sodium bicarbonate solution and concentrated to near-dryness under reduced pressure at 50–60° C. The solid 2-formyl-3-chloro-17α-methyl-17β-hydroxy-5α-androst-2-ene obtained is isolated, washed well with water, and dried; M.P. 104° C., after crystallization from aqueous ethanol.

In the foregoing procedure, the same product is obtained when 3.4 g. of 2 - formyl-3-chloro-17α-methyl-17β-hydroxy-5α-androst-2-ene, diethyl acetal is substituted for the 2 - formyl-3-chloro-17α-methyl-17β-hydroxy-5α-androst-2-ene, dimethyl acetal.

We claim:

1. A member of the class consisting of 3-chloro-17α-methyl-5α-androst-2-ene compounds of the formula

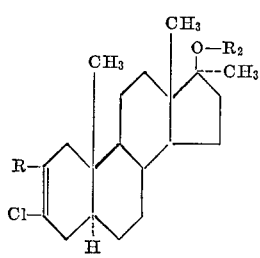

and 2,4 - diformyl-3-chloro-17α-methyl-5α-androst-2-ene compounds of the formula

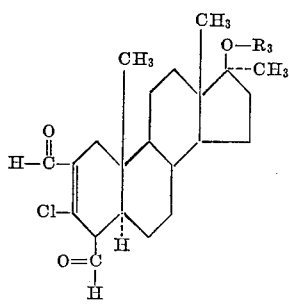

where R is a member of the class consisting of formyl and di-(lower alkoxy)-methyl; $R_2$ is a member of the class consisting of hydrogen and lower alkanoyl; and $R_3$ is lower alkanoyl.

2. 2 - formyl - 3-chloro-17α-methyl-17β-acetoxy-5α-androst-2-ene.

3. 2,4 - diformyl - 3-chloro-17α-methyl-17β-acetoxy-5α-androst-2-ene.

4. 2 - formyl - 3-chloro-17α-methyl-17β-hydroxy-5α-androst-2-ene, dimethyl acetal.

5. 2-formyl-3-chloro-17α-methyl-17β - hydroxy - 5α-androst-2-ene.

6. Process for the production of 3-chloro-17α-methyl-5α-androst-2-ene compounds of the formula

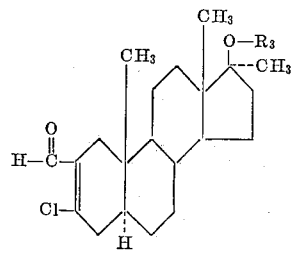

which comprises the reaction of 17α-methyl-5α-androstan-3-one compounds of the formula

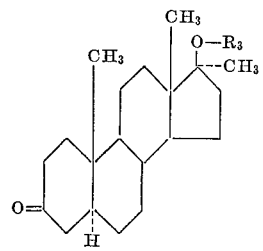

for a period of 1–4 hours at a temperature in the range of 45 to 75° C. with a formylating reagent prepared by mixing phosphorus oxychloride with N,N-dimethylformamide; where $R_3$ is lower alkanoyl.

7. Process for the production of 2-formyl-3-chloro-17α-methyl-17β-acetoxy-5α - androst - 2 - ene which comprises the reaction of 17α-methyl-17β-acetoxy-5α-androstan-3-one with a mixture of phosphorus oxychloride and N,N-dimethylformamide for a period of 1–4 hours at a temperature in the range of 45 to 75° C.

8. Process for the production of 3-chloro-17α-methyl-5α-androst-2-ene compounds of the formula

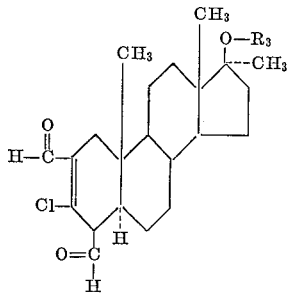

which comprises the reaction of 17α-methyl-5α-androstan-3-one compounds of the formula

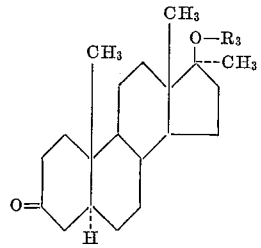

with a mixture of phosphorus oxychloride and N,N-dimethylformamide at a temperature in the range of 45–75° C. for a period of more than 6 hours duration; where $R_3$ is lower alkanoyl.

9. Process for the production of 2,4-diformyl-3-chloro-17α-methyl-17β-acetoxy-5α - androst - 2 - ene which comprises the reaction of 17α-methyl-17β-acetoxy-5α-androstan-3-one with a mixture of phosphorus oxychloride and N,N-dimethylformamide at a temperature in the range of 45–75° C. for a period of more than 6 hours duration.

10. Process for the production of 2-formyl-3-chloro-17α-methyl-17β-hydroxy-5α - androst - 2 - ene which comprises the reaction of 3-chloro-17α-methyl-5α-androst-2-ene compounds of the formula

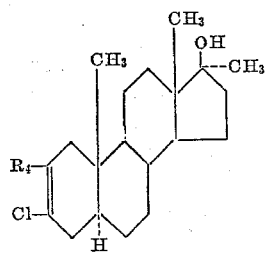

with aqueous mineral acid; where $R_4$ is di-(lower alkoxy)-methyl.

11. Process for the production of 2-formyl-3-chloro-17α-methyl-17β-hydroxy-5α-androst-2-ene which comprises the sulfuric acid-catalyzed hydrolysis of 2-formyl-3-chloro-17α-methyl-17β-hydroxy-5α-androst-2-ene, dimethyl acetal.

References Cited by the Examiner

UNITED STATES PATENTS

| | | | |
|---|---|---|---|
| 3,018,298 | 1/1962 | Klimstra et al. | 260—397.4 |
| 3,055,920 | 9/1962 | Bowers et al. | 260—397.5 |
| 3,127,426 | 3/1964 | Bowers et al. | 260—397.3 |

LEWIS GOTTS, *Primary Examiner.*